United States Patent
Chen (10) Patent No.: US 9,995,995 B2
(45) Date of Patent: Jun. 12, 2018

(54) HEAD-UP DISPLAY DEVICE WITH DUST COVER

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 0 days. days.

(21) Appl. No.: 15/348,644

(22) Filed: Nov. 10, 2016

(65) Prior Publication Data

US 2018/0129125 A1    May 10, 2018

(51) Int. Cl.
| | |
|---|---|
| *G03B 21/14* | (2006.01) |
| *G03B 21/28* | (2006.01) |
| *G03B 21/30* | (2006.01) |
| *B60K 35/00* | (2006.01) |
| *G02B 27/01* | (2006.01) |

(52) U.S. Cl.
CPC ............ *G03B 21/145* (2013.01); *B60K 35/00* (2013.01); *G03B 21/28* (2013.01); *G03B 21/30* (2013.01); *B60K 2350/406* (2013.01); *G02B 27/01* (2013.01)

(58) Field of Classification Search
CPC ..... G02B 27/01–27/0198; G03B 21/28; G03B 21/30; G03B 21/145; B60K 2350/406; B60K 35/00
See application file for complete search history.

(56) References Cited

U.S. PATENT DOCUMENTS

| | | | |
|---|---|---|---|
| 2005/0024490 A1* | 2/2005 | Harada .............. | G02B 27/0149 348/115 |
| 2014/0177064 A1* | 6/2014 | Sugiyama .......... | G02B 27/0101 359/630 |
| 2014/0340851 A1* | 11/2014 | Yomogita ............ | H05K 5/0017 361/725 |

* cited by examiner

*Primary Examiner* — Christina Riddle
*Assistant Examiner* — Christopher Lamb, II
(74) *Attorney, Agent, or Firm* — Guice Patents PLLC (57) ABSTRACT

A head-up display device with dust cover, which includes a base, a display module, a reflective module, an anti-dust cover and an electric drive module, wherein the anti-dust cover at least includes a first cover body and a second cover body, the electric drive module is provided to flip the second cover body, so that the first cover body and the second cover body may be driven to cover an opening of the base, to thereby prevent dust from falling inside the base when a user wipes dust off, to achieve anti-dust purpose and ensure smooth operation.

9 Claims, 7 Drawing Sheets

HEAD-UP DISPLAY DEVICE WITH DUST COVER

BACKGROUND OF THE INVENTION a) Field of the Invention

The present invention relates to a head-up display device with dust cover and, more particularly, to a head-up display device with a dust cover for preventing dust from entering into device body, wherein, three cover bodies set above an opening of a base are provided to fold for covering the opening of the base, to thereby prevent dust from falling inside the base when a user wipes dust off, to achieve anti-dust purpose and ensure smooth operation.

b) Description of Prior Art

Nowadays, popular head-up display devices, also called head up displays, are provided for drivers to reduce number of times and time of looking away from the road ahead, to thereby improve driving safety.

In recent years, there are many external head-up displays for installing in vehicles in the market. The functions of these head-up displays are not only simply displaying car speed and engine speed, but also displaying water temperature, throttle position, oil, speed warning, reversing image, battery voltage, even integrating a speed radar together. Some products are emphasized for their quick installation, they are provided to directly connect to in-vehicle computer without additional cables. It is convenient for drivers that adding data, such as navigation system and distance between rear and the front vehicles, for being displayed by the head-up displays in some luxury vehicles. Price of external head-up display devices in the market are from several hundred dollars for those with simple functions, to more than ten thousand dollars for good quality and various functions.

There are many kinds of external head-up displays with various functions, related technologies may be referred to cited references TW I541524, CN 201410091114.1, CN 201410513879.X, CN 200780049317.2, CN 201320821555.3, TW M480074, most of the cited references have dust-proof function. However, the following problems of present head-up display structure are common:

1. In order to reduce cost, back boards of reflective sheets are used as dust covers in some head-up display, so that there is no protection for the reflective sheet, the reflective sheet may be easily damaged or displaced due to external forces or objects improperly placed on it during it is closed.

2. In some products, opening and closing of anti-dust covers and reflective sheets may be controlled by different power sources independently, the action between the two often incompatible, users are deeply troubled by the high failure rate.

3. In above cited references, a curtain type of cover body may be used as a means of preventing dust in some of them. However, duration of extending or rolling up a curtain is longer, waiting time for users are relatively longer, and enough containing space is needed, the device body is relatively larger. Otherwise, in this kind of curtain type of head-up display devices, the reflective sheets are mostly controlled independently, so incompatible conditions may easily occur.

4. In view of structure of head-up displays in the market, the position of most of their cover bodies is slightly lower than the opening of device body. In this kind of structure, there is a drawback that dust may easily fall inside the device body when a user wipes dust off, over the years, accumulated dust may affect smooth operation and reduce service life of head-up displays.

SUMMARY OF THE INVENTION

In order to solve the above problems, the inventor finally completed the head-up display device with dust cover of the present invention after numerous improvements, namely, the object of the present invention is to provide a head-up display device with dust cover, three cover bodies set above an opening of the base are provided to be driven to fold, to thereby prevent dust from falling inside the base when a user wipes dust off, to achieve anti-dust purpose and ensure smooth operation.

To achieve the object, the head-up display device with dust cover of the present invention, including:

a base, a containing space and an opening are set inside the base;

a display module, which is set in the containing space and is provided to project images;

a reflective module, which is set in the containing space and is provided to reflect the images projected by the display module;

an anti-dust cover, which includes at least a first cover body and a second cover body, the first cover-body and the second cover body are set on the opening, the first cover body is engaged with the second cover body;

an electric drive module, which is placed in the containing space, the electric drive module is engaged with the second cover body, the second cover body is driven by the electric drive module to flip, the first cover body is driven by the second cover body to move backwards, so that the first cover body and the second cover body are formed as an open mode and images of the display module may be projected to the reflective module.

The reflective module is an electric reflective module.

The head-up display device with dust cover of the present invention further includes a reflector, the reflector placed in the containing space is provided to reflect images projected by the display module.

The second cover body, wherein a connecting piece is set on it, the connecting piece includes a first engaging element and a connecting groove, the first engaging element is engaged with a second engaging element of the base, the connecting groove is engaged with a connecting shaft of the electric drive module.

The first cover body is engaged with an end of a connecting rod, another end of the connecting rod is engaged with an inner wall of the base.

The anti-dust cover further includes a third cover body, the third cover body is set on the opening, the third cover body is engaged with the second cover body, the first cover body, the second cover body and the third cover are formed a z-shape when being opened, the first cover body is replaced the position of the third cover body to form a housing cover behind the reflective module.

The anti-dust cover further includes a third cover body, the third cover body is set on the opening, two rotation axes and two second elastic elements are respectively set on two ends of a rear side of the third cover body, the third cover body is flipped and moved downwards when the first cover body and the second cover body are folded, and the position is empty for the folded first cover body and the second cover body.

The base further includes a guide groove, the guide groove is set on an inner wall of the base, two guide elements are respectively set on two ends of the front side of the first cover body, the guide elements are set in the guide grooves, the first cover body is guided by the guide groove to limit the folded position in a rear side of the second cover body, the second cover body is rotated by force and flipped over 180 degrees, and inner surfaces of the first cover body and the second cover body are overlapped with each other.

The anti-dust cover further includes a third cover body, the third cover body is set on the opening, the second cover body is engaged with the third cover body, a first elastic element is set on a rear side of the third cover body, two guide plates are set on a rear side of the inner wall of the base, a guide ramp is set on the guide plate, the guide ramp corresponded to a rear edge of the third cover body is provided to guide the third cover body for direction.

The base is embedded in a dashboard of a vehicle.

DETAILED DESCRIPTION OF THE INVENTION

Please refer to FIG. 1, FIG. 2, FIG. 3 and FIG. 4, which is the first embodiment of the head-up display device with dust cover of the present invention, including:

a base 1, a containing space 11 and an opening 12 are set inside it, a circuit board 13 is set in the containing space 11, the base 1 is embedded in a dashboard L of a vehicle;

a display module 2, which is set in the containing space 11 and electrically connected to the circuit board 13 for receiving images output from the circuit board 13, and projecting the images along a first image optical path D1;

a reflector 3, which is placed in the containing space 11, is provided to reflect the images projected by the display module 2 along a second image optical path D2;

a reflective module 4, which is set in the containing space and is provided to reflect the images projected by the display module; the reflective module is an electric reflective module, the reflective module 4 is placed in the containing space 11, the reflective module 4 includes a reflective sheet 41, the reflective sheet 41 is a translucent and semi-reflective concave mirror, since concave mirrors may enlarge virtual image, the reflective sheet 41 is provided to reflect and enlarge the image reflected by the reflector 3 and project it along a third image optical path D3, and the images may be displayed overlapped with a scene of the road ahead.

an anti-dust cover 5, which includes at least a first cover body 51, a second cover body 52 and a third cover body 53, the first cover body 51, the second cover body 52 and the third cover body 53 are set above the opening 12, the first cover body is engaged with the second cover body; the first cover body 51, the second cover body 52 and the third body 53 are set above the opening 12, two ends of two connecting rods 55 are respectively engaged with two ends of the first cover body 51, another ends of the connecting rods 55 are engaged with the inner wall of the base 1, two connecting pieces 54 are respectively set on two sides of the second cover body 52, the first cover body, the second cover body and the third cover are formed a z-shape when being opened.

an electric drive module 6, which is placed in the containing space 11, and electrically connected to the circuit board 13, the connecting shaft 61 of the electric drive module 6 is engaged with the second cover body 52, the second cover body 52 is driven by the electric drive module 6 to flip, the first cover body 51 is driven by the second cover body 52 to move backwards, so that the first cover body 51 and the second cover body 52 are formed as an open mode and images of the display module 3 may be projected to the reflective module 4. under the open mode, the first cover body 51 is replaced the position of the third cover body 53 to form a housing cover behind the reflective sheet 41.

The connecting piece 54 includes a first engaging element 541 and a connecting groove 542, the first engaging element 541 is engaged with a second engaging element 15 of the base 1, the connecting groove 542 is engaged with a connecting shaft 61 of the electric drive module 6.

The connecting rods 55, two third engaging elements 551 are set on its one end for engaging with the fourth engaging element 14 to form a first shaft mechanism B1, fifth engaging elements 552 set on another end of the connecting rods 55 are engaged with a sixth engaging element 511 on a front side of the first cover body 51 to form a second shaft mechanism B2, the seventh engaging elements 512 on a rear side of the first cover body 51 are engaged with eight engaging elements on a front side of the second cover body 52 to form a third shaft mechanism B3.

The third cover body 53, a tenth engaging element 531 is set on its front side, the tenth engaging element 531 is engaged with the ninth engaging element 522 on a rear side of the second cover body 52 to form a fourth shaft mechanism B4, a first hook hole 533 is set on an inner surface of the rear side of the third cover body 53, at least a second hook hole 18 and two guide plates 16 are set on a rear side of the inner wall of the base 1, an end of a elastic element S1 is set on the first hook hole 533, another end of the first elastic element S1 is set on the second hook hole 18, the first elastic element S1 is a spring, a guide ramp 161 is set on the guide plate 16, a guide portion 532 is set on a rear end of the third cover body 53 corresponding to the guide ramp 161, when the anti-dust cover 5 is opened, the third cover body 53 is driven by the second cover body 52, the guide portion 532 is pulled to touch on the guide ramp 161 of the guide plate 16 by elasticity of the first elastic element S1, and the guide portion 532 may slide and move along the guide ramp 161 to support and guide the third cover body 53 to move.

The base 1, a cover plate 10 is set above it, the opening 12 of the base 1 is set on the cover plate 10.

The reflective module 4, its bottom is fixed to a side of the electric drive module 6.

Figure 1:
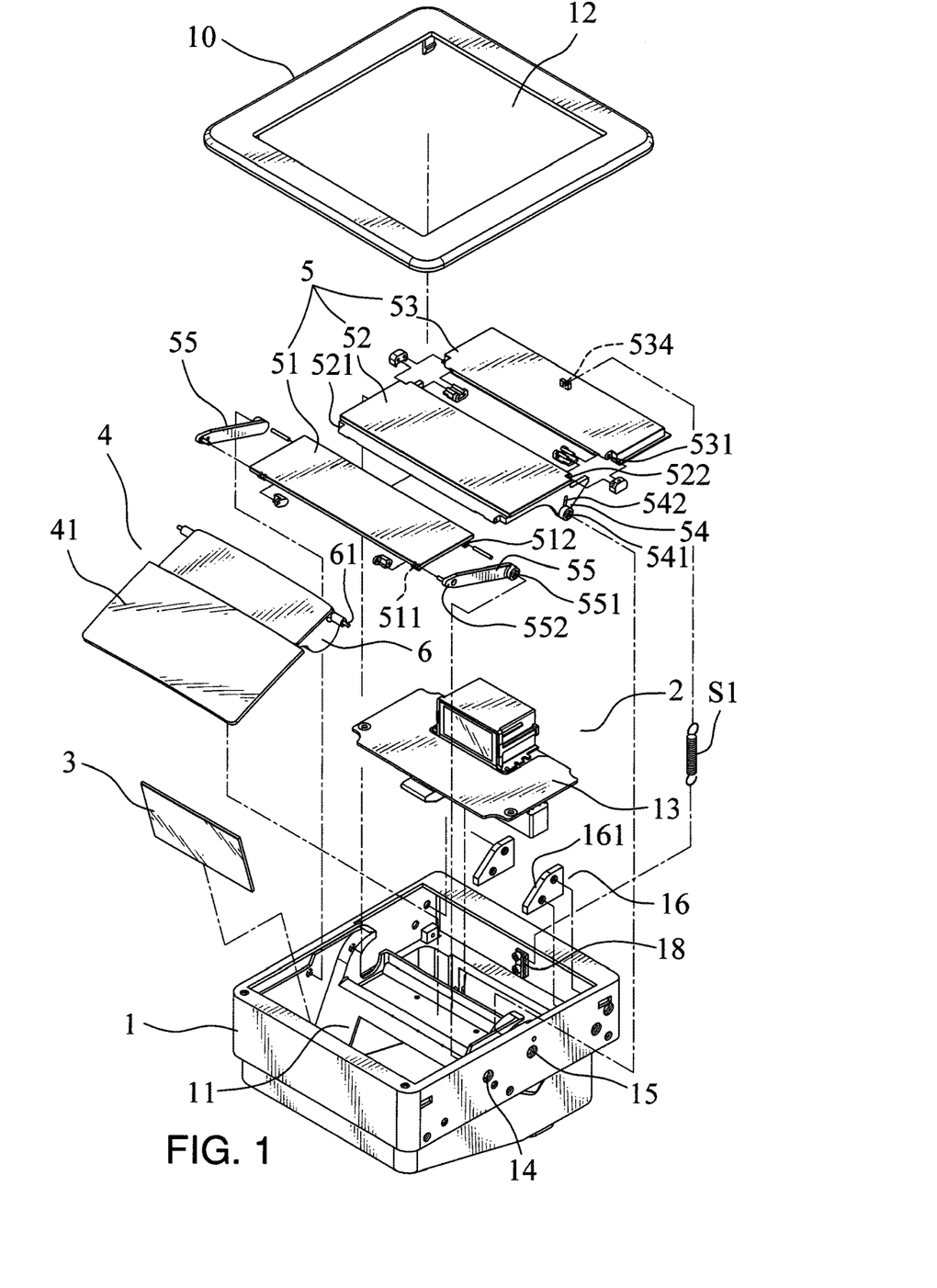
FIG. 1 is a three-dimensional exploded diagram of the first embodiment of the present invention.
Figure 2:
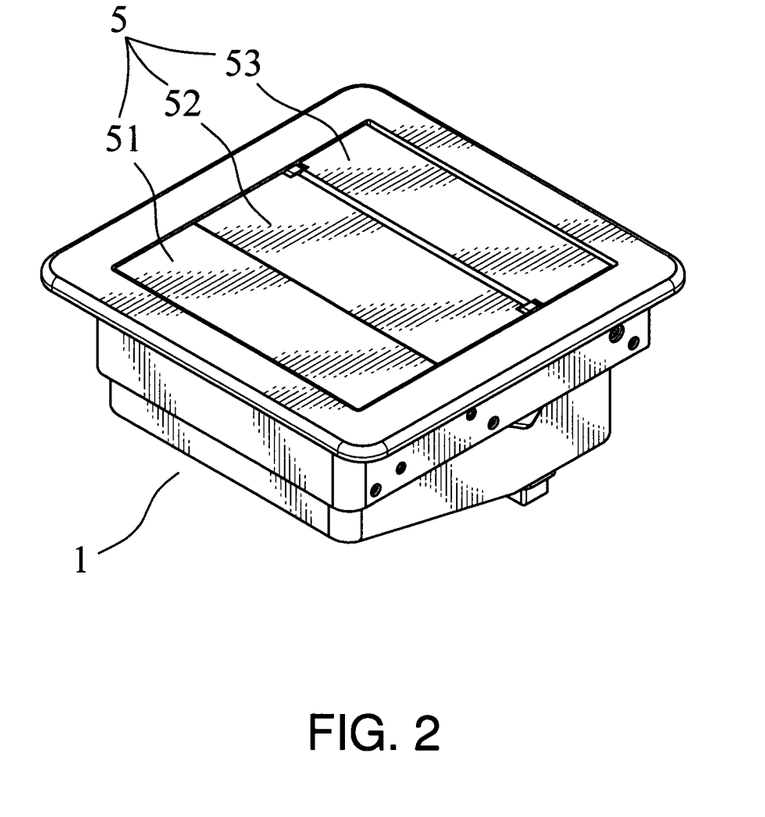
FIG. 2 is a three-dimensional schematic diagram of the first embodiment of the present invention.
Figure 3:
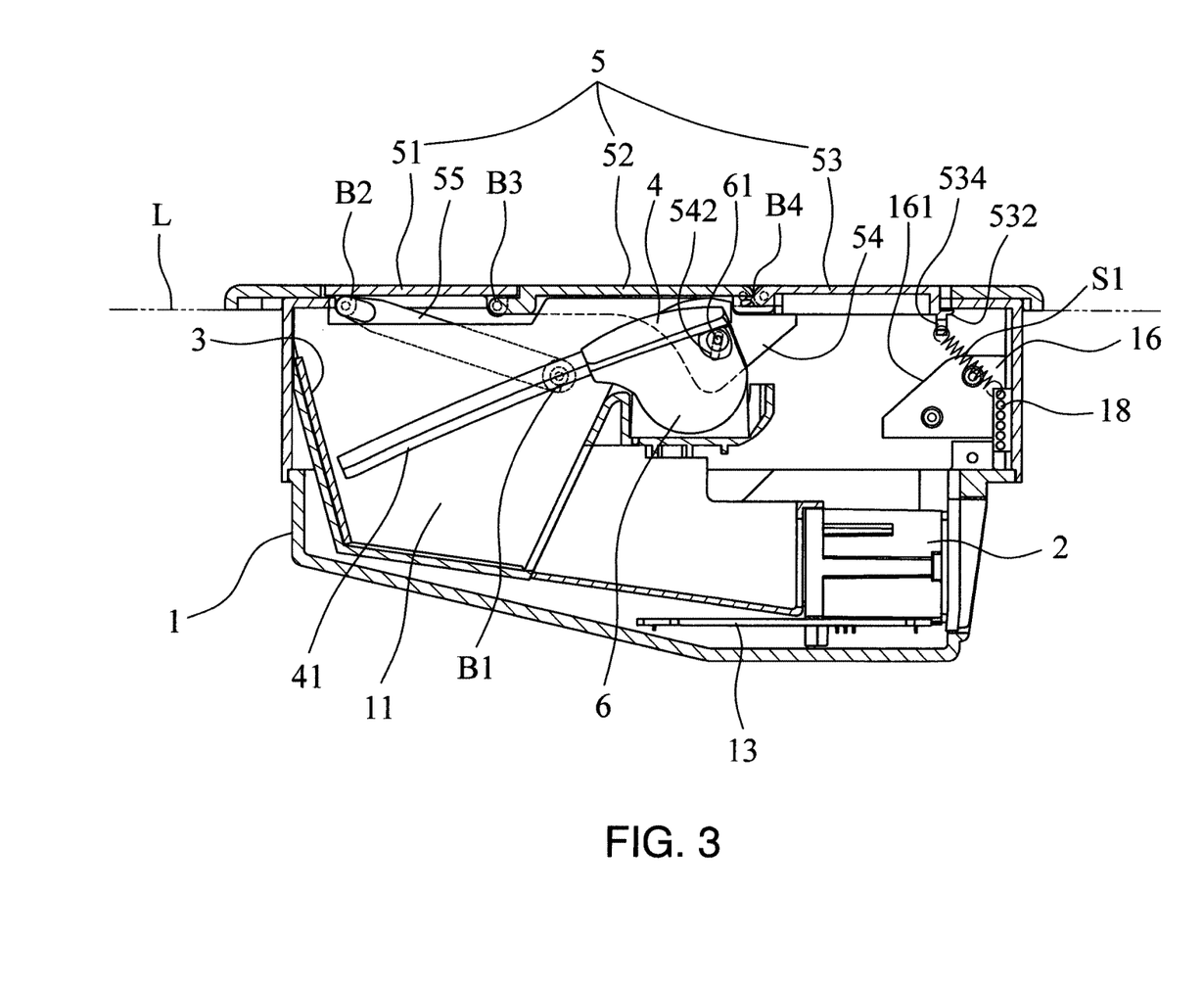
FIG. 3 is a schematic diagram of the closed mode of the first embodiment of the present invention.
Figure 4:
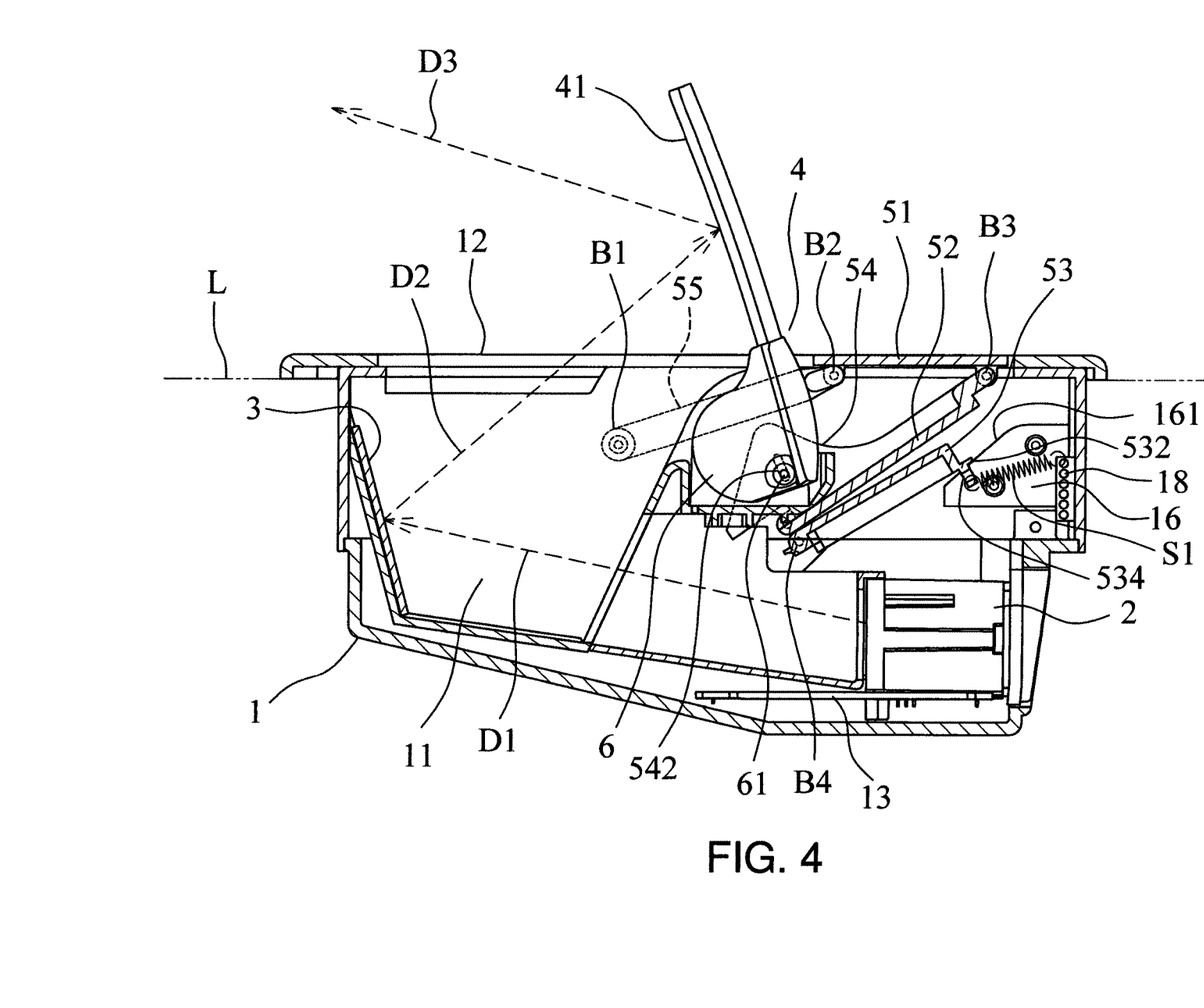
FIG. 4 is a schematic diagram of the open mode of the first embodiment of the present invention.

In FIG. 3, it is a schematic diagram of the closed mode of the anti-dust cover 5 of the first embodiment of the present invention. When a user want to start to use the reflective sheet 41, the electric drive module 6 rotates and the second cover body 52 is driven by its connecting shaft 61, the first cover body 51 and the third cover body 53 are driven to move, the first cover body 51 is driven to move backwards by the second cover body 52, so that the first cover body 51, the second cover body 52 and the third cover body 53 are formed a z-shape when being opened, and then the reflective sheet 41 of the reflective module 4 is flipped outwards to a watching position, so that image of the display module 3 may be projected to the reflective sheet 41 (as shown in FIG. 4).

When a user want to store the reflective sheet 41, the electric drive module 6 rotates reversely, the reflective sheet 41 of the reflective module 4 is flipped inwards to a stored position, the second cover body 52 is driven by the connecting shaft 61 and the first cover body 51 and the third cover body 53 are driven to move, so that the first cover body 51 is driven to move forwards by the second cover body 52, the first cover body 51, the second cover body 52 and the third cover body 53 are extended to cover the opening 12 of the base 1 to form the closed mode (as shown in FIG. 3), to prevent dust entering and ensure smooth operation.

Figure 5:
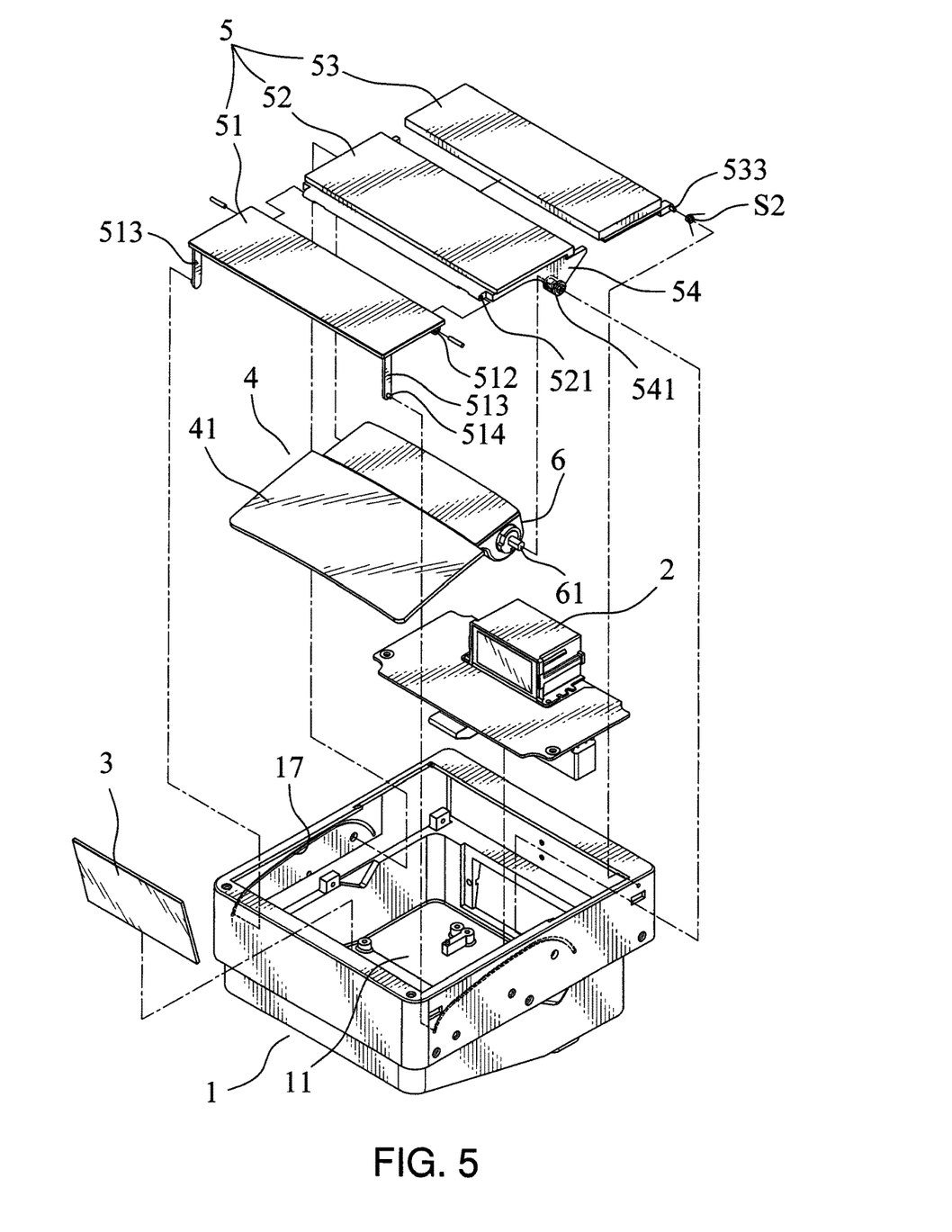
FIG. 5 is a three-dimensional exploded diagram of the second embodiment of the present invention.
Figure 6:
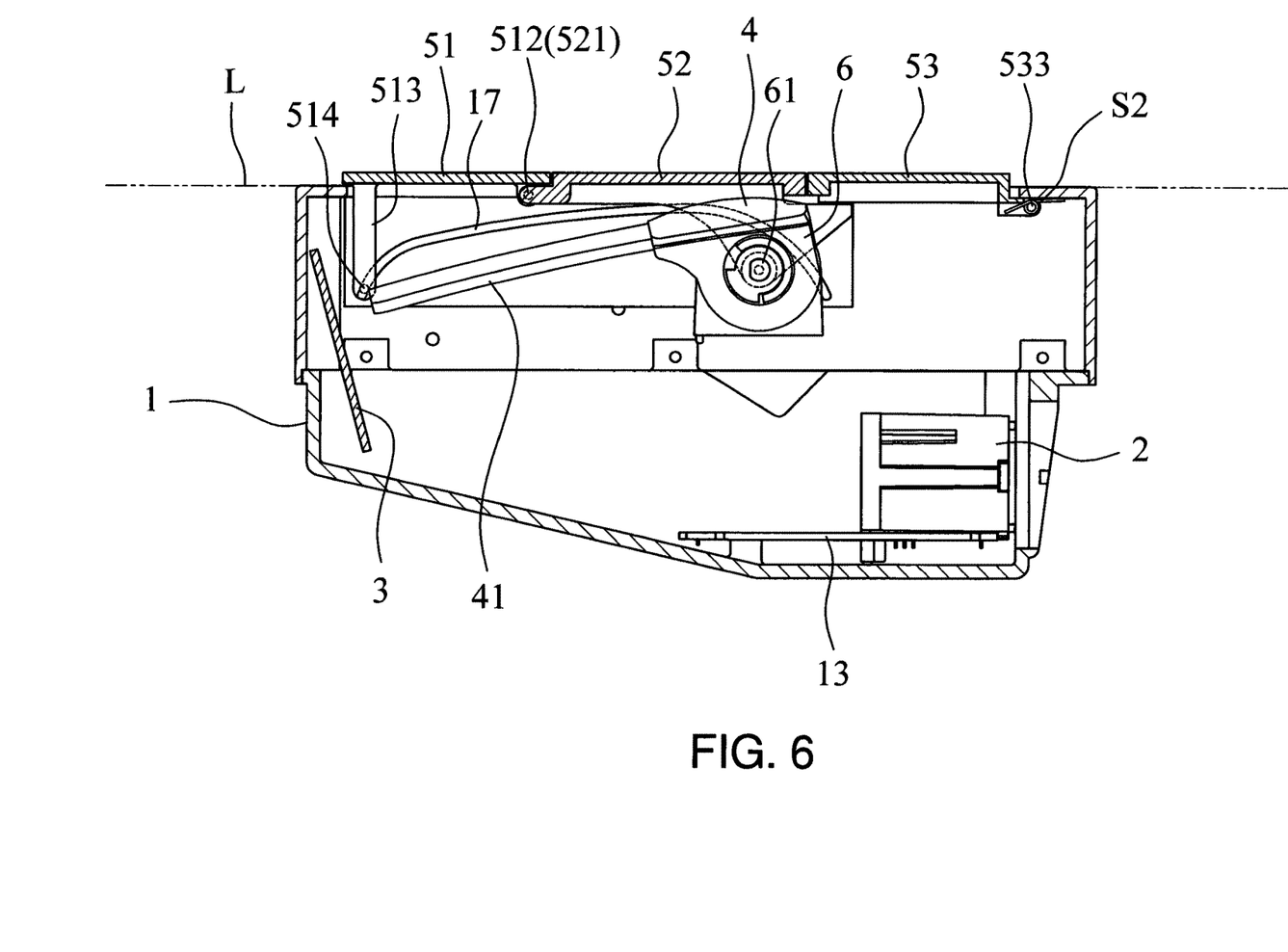
FIG. 6 is a schematic diagram of the closed mode of the second embodiment of the present invention.
Figure 7:
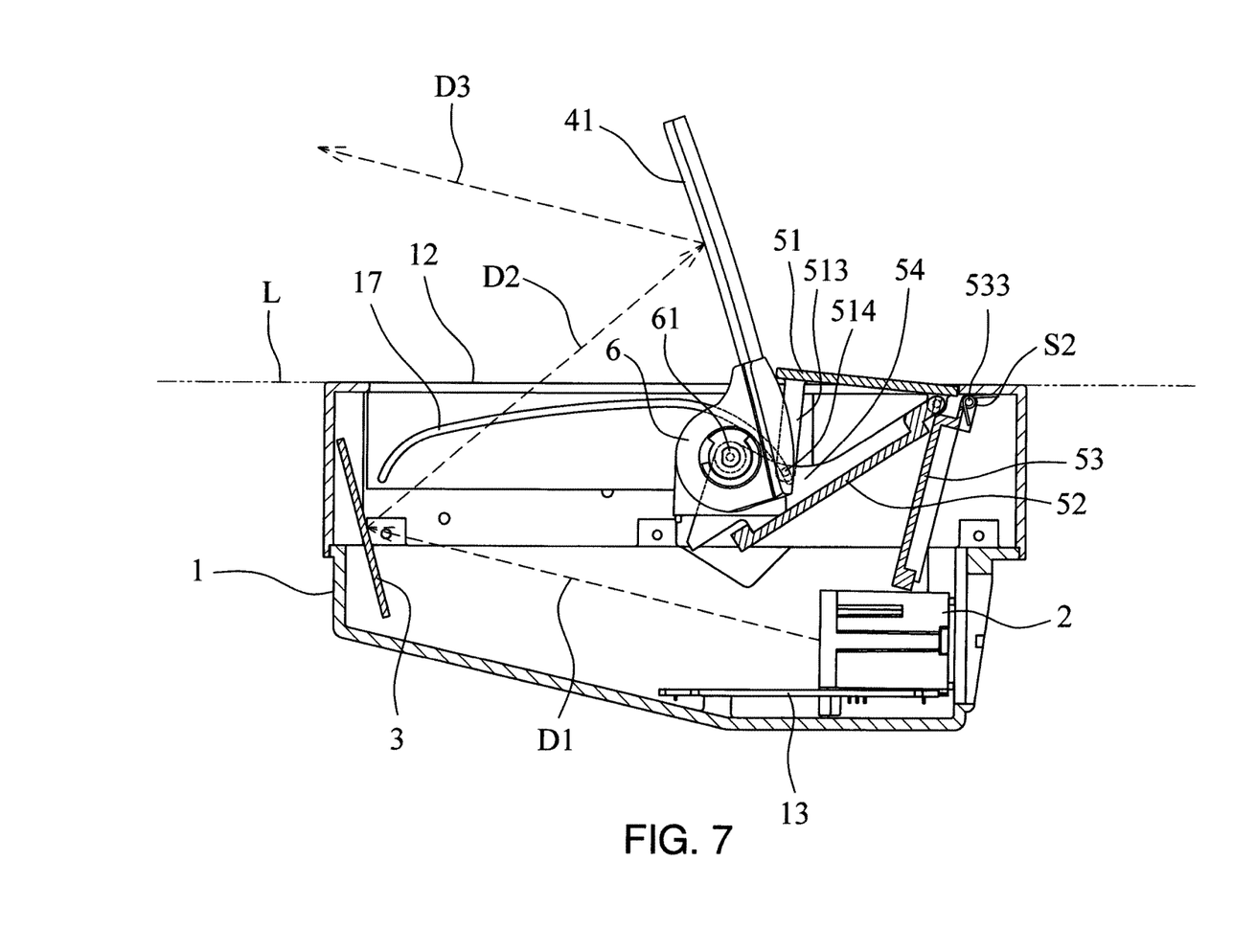
FIG. 7 is a schematic diagram of the open mode of the second embodiment of the present invention.

Please refer to FIG. 5, FIG. 6, FIG. 7, which is the second embodiment of the head-up display device with dust cover of the present invention, including:

a base 1, a containing space 11 and an opening 12 are set inside of it, a circuit board 13 is set in the containing space 11, the base 1 is embedded in a dashboard L of a vehicle, two guide grooves 17 are respectively set in two sides of the inner wall of the base 1;

a display module 2, which is set in the containing space 11 and electrically connected to the circuit board 13 for receiving images output from the circuit board 13, and projecting the images along a first image optical path D1;

a reflector 3, which is placed in the containing space 11, is provided to reflect images projected by the display module 2 along a second image optical path D2;

a reflective module 4, which is an electric reflective module, the reflective module 4 is placed in the containing space 11, the reflective module 4 includes a reflective sheet 41, the reflective sheet 41 is a translucent and semi-reflective concave mirror, since concave mirrors may enlarge virtual image, the reflective sheet 41 is provided to reflect and enlarge the image reflected by the reflector 3 and project it along a third image optical path D3, and the images may be displayed overlapped with a scene of the road ahead;

an anti-dust cover 5, which includes at least a first cover body 51, a second cover body 52 and a third cover body 53, the first cover body 51, the second cover body 52 and the third cover body 53 are set above the opening 12, the first cover body 51 is engaged with the guide groove 17, two connecting piece 54 are respectively set on two sides of the second cover body 52, the first cover body 51 is engaged with the second cover body 52, the third cover body 53 is independently set above the opening 12, two rotation axes 533 and two second elastic elements S2 are respectively set on two ends of a rear side of the third cover body 53, the second elastic elements S2 are torsion springs, the rotation axes 533 are engaged with the base 1, the second elastic elements S2 are set on the rotation axes 533, the third cover body is flipped and moved downwards when the first cover body and the second cover body are folded, and the position is empty for the folded first cover body and the second cover body, the first cover body 51 is guided by the guide groove 17 to limit the folded position in a rear side of the second cover body 52, the second cover body 52 is rotated by force and flipped over 180 degrees, and inner surfaces of the first cover body 51 and the second cover body 52 are overlapped with each other;

an electric drive module 6, which is placed in the containing space 11, and electrically connected to the circuit board 13, the electric drive module 6 is engaged with the second cover body 52, the second cover body 52 is driven by the electric drive module 6 to flip, the first cover body 51 is driven by the second cover body 52 to move backwards, so that the first cover body 51 and the second cover body 52 are formed as an open mode and images of the display module 3 may be projected to the reflective module 4. under the open mode, the first cover body 51 is replaced the position of the third cover body 53 to form a housing cover behind the reflective sheet 41.

The connecting piece 54, which includes a first engaging element 541, a side of the first engaging element 541 is engaged with the second engaging element 15 of the base 1, another side of the first engaging element 541 is engaged with the connecting shaft 61 of the electric drive module 6.

The first cover body 51, two guide columns 513 are set on two ends of its front side, two guide elements 514 are respectively set on each guide column 513, the guide element 514 are respectively set on the guide groove 17.

The reflective module 4, its bottom is fixed to a side of the electric drive module 6.

In FIG. 6, it is a schematic diagram of the closed mode of the anti-dust cover 5 of the second embodiment of the present invention. When a user want to start to use the reflective sheet 41, the electric drive module 6 rotates and the second cover body 52 is driven by its connecting shaft 61, the first cover body 51 is driven to move, the first cover body 51 is driven to be folded backwards by the second cover body 52 and the third cover body 53 is forced to flip and move downwards, the position is empty for the folded first cover body 51 and the second cover body 52, the position is empty for the folded first cover body 51 and the second cover body 52, so that inner surfaces of the first cover body 51 and the second cover body 52 are overlapped with each other, to form the opened mode, and then the reflective sheet 41 of the reflective module 4 is flipped outwards to a watching position, so that image of the display module 3 may be projected to the reflective sheet 41 (as shown in FIG. 7).

When a user want to store the reflective sheet 41, the electric drive module 6 rotates reversely, the reflective sheet 41 of the reflective module 4 is flipped inwards to a stored position, the second cover body 52 is driven to rotate reversely by the connecting shaft 61 and the first cover body 51 is driven to move, so that the first cover body 51 is driven to move forwards by the second cover body 52, the third cover body 53 may not be forced anymore, at the time the third cover body 53 is flipped upwards by restore elasticity of the second elastic element S2, the first cover body 51, the second cover body 52 and the third cover body 53 are covered the opening 12 of the base 1 to form the closed mode (as shown in FIG. 7), to prevent dust entering and ensure smooth operation.

What is claimed is:
1. A head-up display device with dust cover, including:
a base, a containing space and an opening are set inside the base;
a display module, which is set in the containing space and is provided to project images;
a reflective module, which is set in the containing space and is provided to reflect the images projected by the display module;
an anti-dust cover, which includes at least a first cover body and a second cover body, the first cover body and the second cover body are set on the opening, the first cover body is engaged with the second cover body;

an electric drive module, which is placed in the containing space, the electric drive module is engaged with the second cover body, the second cover body is driven by the electric drive module to flip, the first cover body is driven by the second cover body to move backwards, so that the first cover body and the second cover body are formed as an open mode and images of the display module may be projected to the reflective module;

wherein the anti-dust cover further includes a third cover body, the third cover body is set on the opening, the third cover body is engaged with the second cover body, the anti-dust cover is moveable between an open position and a closed position, when the anti-dust cover is located in the open position, the first cover body, the second cover body and the third cover body form a z-shape, the first cover body moves to a position occupied by the third cover body in the open position and the second cover body and the third cover body move into the space of the base and are located below the first cover body to form a housing cover behind the reflective module.

2. The head-up display device with dust cover as claimed in claim 1, wherein the reflective module is an electric reflective module.

3. The head-up display device with dust cover as claimed in claim 1, further includes a reflector, the reflector placed in the containing space is provided to reflect images projected by the display module.

4. The head-up display device with dust cover as claimed in claim 1, wherein a connecting piece is set on the second cover body, the connecting piece includes a first engaging element and a connecting groove, the first engaging element is engaged with a second engaging element of the base, the connecting groove is engaged with a connecting shaft of the electric drive module.

5. The head-up display device with dust cover as claimed in claim 1, wherein the first cover body is engaged with an end of a connecting rod, another end of the connecting rod is engaged with an inner wall of the base.

6. The head-up display device with dust cover as claimed in claim 1, wherein two rotation axes and two second elastic elements are respectively set on two ends of a rear side of the third cover body, the third cover body is flipped and moved downwards when the first cover body and the second cover body are folded, and a position is empty for the folded first cover body and the second cover body.

7. The head-up display device with dust cover as claimed in claim 1, wherein the base further includes a guide groove, the guide groove is set in an inner wall of the base, two guide elements are respectively set on two ends of a front side of the first cover body, the guide elements are respectively set in the guide groove, the first cover body is guided by the guide groove to limit a flipped position in a rear side of the second cover body, the second cover body is rotated by force and flipped over 180 degrees, and inner surfaces of the first cover body and the second cover body are overlapped with each other.

8. The head-up display device with dust cover as claimed in claim 1, wherein the second cover body is engaged with the third cover body, a first elastic element is set on a rear side of the third cover body, two guide plates are set on a rear side of an inner wall of the base, a guide ramp is set on at least one of the two guide plates, the guide ramp corresponds to a rear edge of the third cover body and is provided to guide the third cover body for direction.

9. The head-up display device with dust cover as claimed in claim 1, wherein the base is embedded in a dashboard of a vehicle.

* * * * *